US008234516B2

(12) United States Patent
Wang et al.

(10) Patent No.: US 8,234,516 B2
(45) Date of Patent: Jul. 31, 2012

(54) TOPOLOGY COLLECTION METHOD AND DUAL CONTROL BOARD DEVICE FOR A STACKING SYSTEM

(75) Inventors: Yong Wang, Beijing (CN); Xiaolong Hu, Beijing (CN); Yiquan Yang, Beijing (CN)

(73) Assignee: Hangzhou H3C Technologies, Co., Ltd., Zhejiang (CN)

( * ) Notice: Subject to any disclaimer, the term of this patent is extended or adjusted under 35 U.S.C. 154(b) by 201 days.

(21) Appl. No.: 12/685,949

(22) Filed: Jan. 12, 2010

(65) Prior Publication Data
US 2010/0185893 A1 Jul. 22, 2010

(30) Foreign Application Priority Data
Jan. 20, 2009 (CN) .......................... 2009 1 0077232

(51) Int. Cl.
G06F 11/00 (2006.01)
(52) U.S. Cl. ................................ 714/3; 712/31; 712/202
(58) Field of Classification Search .................. 714/3, 2; 712/31, 202
See application file for complete search history.

(56) References Cited

U.S. PATENT DOCUMENTS

| | | | |
|---|---|---|---|
| 6,785,272 B1 * | 8/2004 | Sugihara | 370/386 |
| 7,675,869 B1 * | 3/2010 | Anker et al. | 370/255 |
| 7,764,682 B2 * | 7/2010 | Sievert | 370/389 |
| 2006/0092853 A1 * | 5/2006 | Santoso et al. | 370/252 |
| 2006/0146697 A1 * | 7/2006 | Magret et al. | 370/219 |
| 2008/0137530 A1 * | 6/2008 | Fallis et al. | 370/216 |
| 2008/0205418 A1 * | 8/2008 | Rose et al. | 370/401 |
| 2008/0301319 A1 * | 12/2008 | Dernosek et al. | 709/232 |
| 2009/0086620 A1 * | 4/2009 | Fowler et al. | 370/216 |
| 2009/0135715 A1 * | 5/2009 | Bennah et al. | 370/217 |
| 2010/0017873 A1 * | 1/2010 | Sievert | 726/17 |

FOREIGN PATENT DOCUMENTS

| | | |
|---|---|---|
| CN | 1859214 | 11/2006 |
| CN | 101056195 | 10/2007 |
| TW | I230526 | 4/2005 |

* cited by examiner

Primary Examiner — Scott Baderman
Assistant Examiner — Loan L. T. Truong (57) ABSTRACT

The invention provides a topology collection method and dual control board device applicable to a stacking system comprising dual control board devices. A master control board of a dual control board device advertises through a stack port the topology information of the member device in which the master control board resides, including information about the master control board and, if a slave control board is present, information about the slave control board; and stores the topology information or updates the existing topology information upon receiving the topology information of the stacking system through the stack port, and backs up the stored topology information of the stacking system to the slave control board after the slave control board is inserted. This invention is applicable for collecting the topology information of a stacking system comprising distributed dual control board devices.

29 Claims, 5 Drawing Sheets

| Member ID 1 | Priority information | Number of each board | Bridge MAC address of the master control board | Slave |
| | | | Bridge MAC address of the slave control board | Slave |
| Member ID 2 | Priority information | Number of each board | Bridge MAC address of the master control board | Master |
| | | | Bridge MAC address of the slave control board | Slave |
| Member ID 3 | Priority information | Number of each board | Bridge MAC address of the master control board | Slave |
| | | | Bridge MAC address of the slave control board | Slave |
| Member ID 4 | Priority information | Number of each board | Bridge MAC address of the master control board | Slave |
| | | | Bridge MAC address of the slave control board | Slave |

FIG. 6

TOPOLOGY COLLECTION METHOD AND DUAL CONTROL BOARD DEVICE FOR A STACKING SYSTEM

CROSS-REFERENCE TO RELATED APPLICATIONS

This application claims the benefit under 35 U.S.C. §119 (a)-(d) of Chinese Application 200910077232.6 filed on Jan. 20, 2009.

TECHNICAL FIELD

This invention relates in general to the field of network communications and, more particularly, to a topology collection method and dual control board device for a stacking system.

BACKGROUND OF THE INVENTION

Stacking technology enables two or more devices to be connected together to form a stacking system that can be managed as a single device, thus providing high availability and scalability, and simplifying management. A stacking system can comprise centralized devices or distributed devices. The devices of a stacking system are connected through stack cables in a daisy chain, ring, or star structure. Special topology management software is used to collect the topology information and the changes in the topology structure of the whole stacking system. The present invention is primarily applicable for collecting topology information in a daisy chain or ring structure.

Figure 1:
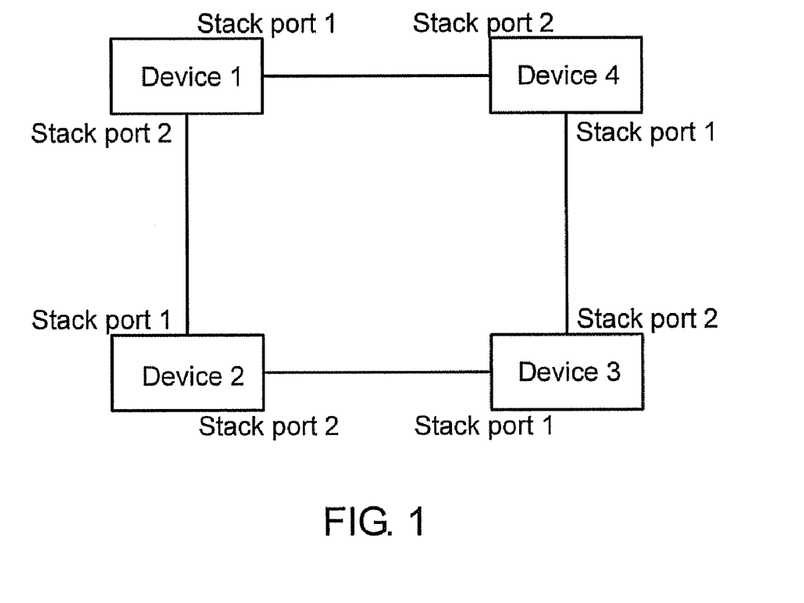
FIG. 1 illustrates the structure of a stacking system comprising centralized devices.

Each member device of a stacking system comprising centralized devices, as shown in FIG. 1, has one or two stack ports, and periodically broadcasts topology advertisement messages through the stack port or ports to inform other member devices in the stacking system of the topology information of the sending member device. The topology information sent by each member device includes the member device ID, priority information, whether the current member device is the master device, bridge MAC addresses, and other topology information. One of the member devices in the stacking system is elected as the master device according to a predefined election strategy. The master device collects the topology information contained in the topology advertisement messages sent by other member devices, generates the topology information of the whole stacking system, and broadcasts the topology information to other member devices. All the other member devices store the topology information of the stacking system.

After storing the topology information of the stacking system, each member device maintains connections with neighboring devices by sending out hello packets periodically. When a member device detects that a neighboring device fails, that is, the port is down, the member device informs other member devices of the failure. The master device then re-collects the topology information of each member device, and broadcasts to other member devices the latest topology information of the stacking system, so that the member devices can update the stored topology information of the stacking system in time. When a new member device is introduced to the stacking system, the new member device informs the whole stacking system of its existence. The master device also re-collects the topology information of each member device and broadcasts the latest topology information of the whole stacking system to other member devices, so that the member devices can update the stored topology information of the stacking system in time.

Figure 2A:
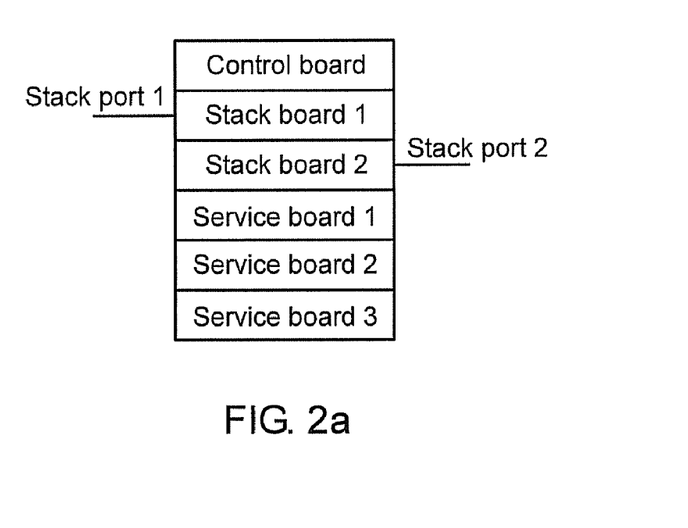
FIG. 2a illustrates the components of a single control board device.

In a stacking system comprising distributed single control board devices, each member device comprises one control board, one or two stack boards, and multiple service boards, as shown in FIG. 2a. The stacking system collects the topology information in the same way as the stacking system comprising distributed devices. The topology information advertised by the distributed single control board devices includes the internal topology information of the member devices, such as the slot numbers.

Figure 2B:
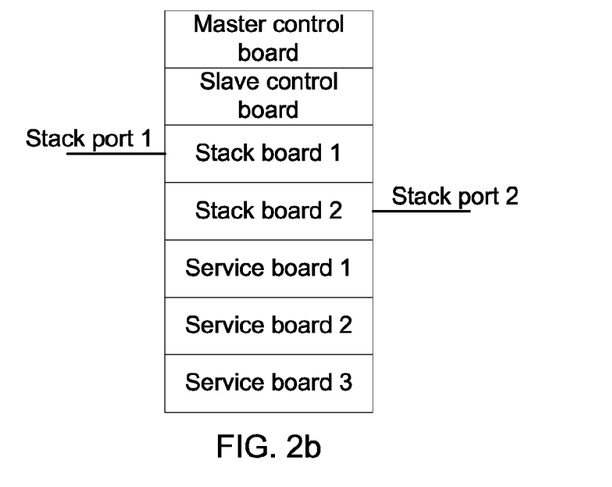
FIG. 2b illustrates the components of a dual control board device.

In a stacking system comprising distributed dual control board devices, each member device has two control boards, as shown in FIG. 2b. The control boards serve as the master control board and slave control board, respectively. Because both the master and slave control boards run topology management software, the two control boards serve as two topology nodes in the stacking system. If the master control board fails, the slave control board takes over the job of the master control board in time, and thus the stacking system can operate normally. Due to its particularity, a distributed dual control board device cannot use the topology collection method for centralized devices and distributed single control board devices. A method suitable for collecting the topology information of a stacking system comprising distributed dual control board devices is needed.

SUMMARY OF THE INVENTION

The present invention provides a topology collection method and dual control board device applicable to a stacking system comprising dual control board devices.

A method for collecting the topology information of a stacking system, which is applicable to a stacking system comprising dual control board devices, comprises: employing a master control board of a dual control board device to advertise through a stack port the device topology, which includes information about the master control board and, if a slave control board is present, information about the slave control board; and the topology information of the stacking system or updating the existing topology information upon receipt of the topology information, and backing up the stored topology information to the slave control board if a slave control board is present.

A dual control board device, as a member device of a stacking system, comprises a master control board and a slave control board, wherein the master control board advertises through a stack port the topology information of the member device in which the master control board resides, including information about the master control board and, if a slave control board is inserted into the device, information about the slave control board; stores the topology information or updates the existing topology information upon receiving topology information of the stacking system through the stack port, and backs up the stored topology information of the stacking system to the slave control board after a slave control board is inserted.

The slave control board stores the topology information of the stacking system or updates the existing topology information.

The preceding technical scheme shows that the master control board of a dual control board device advertises topology information of the member device in which the master control board resides. The topology information includes information about the master control board and, if a slave control board is present, information about the slave control board. Thus the master control board and the slave control board serve as two topology nodes in the stacking system topology. In addition, after storing or updating the topology information of the stacking system according to the received information, the master control board backs up the topology information to the slave control board, so that the slave control board can also establish the stacking system topology. Upon a master/slave switchover due to a master control board failure or removal, the slave control board becomes the master control board in time, thus ensuring that the member device does not quit the stacking system and that services such as packet forwarding are performed normally according to the topology information of the stacking system. This invention is applicable for collecting the topology information of a stacking system comprising distributed dual control board devices.

DETAILED DESCRIPTION OF THE INVENTION

To clarify the aims, technical proposals, and advantages of the present invention, the present invention is described below in view of the drawings and embodiments.

Figure 3:
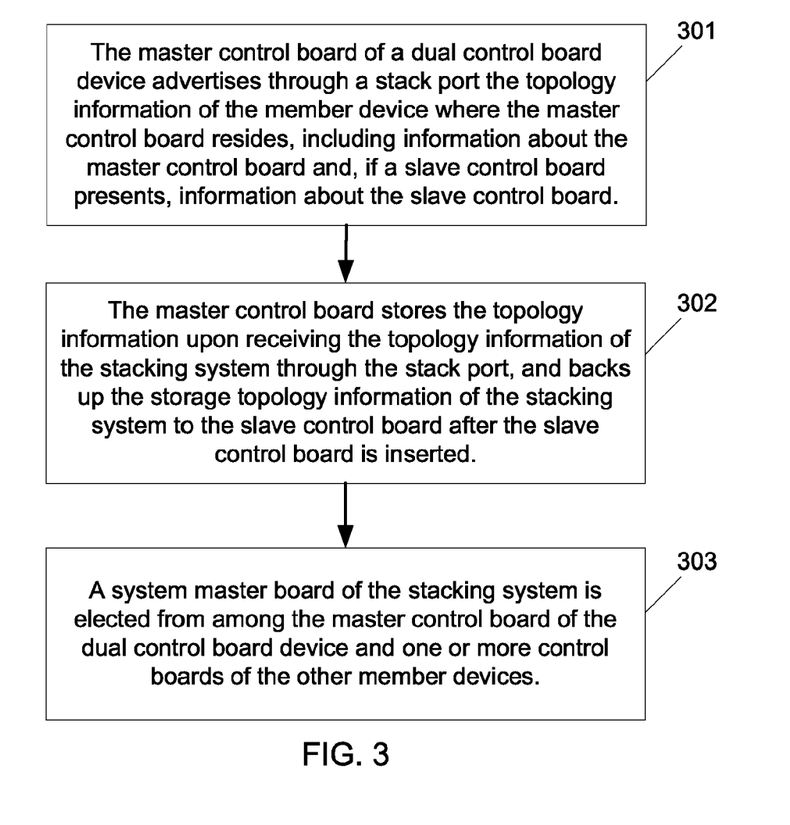
FIG. 3 is a flow chart of the method according to the embodiment of the present invention.

As shown in FIG. 3, the method provided by the present invention comprises the following steps.

At step 301, the master control board of a dual control board device advertises through a stack port device topology information about the master control board and, if a slave control board is present, about the slave control board.

At step 302, upon receiving topology information of the stacking system through a stack port, the master control board stores the topology information and, if the slave control board is present, backs up the topology information to the slave control board.

Figure 4:
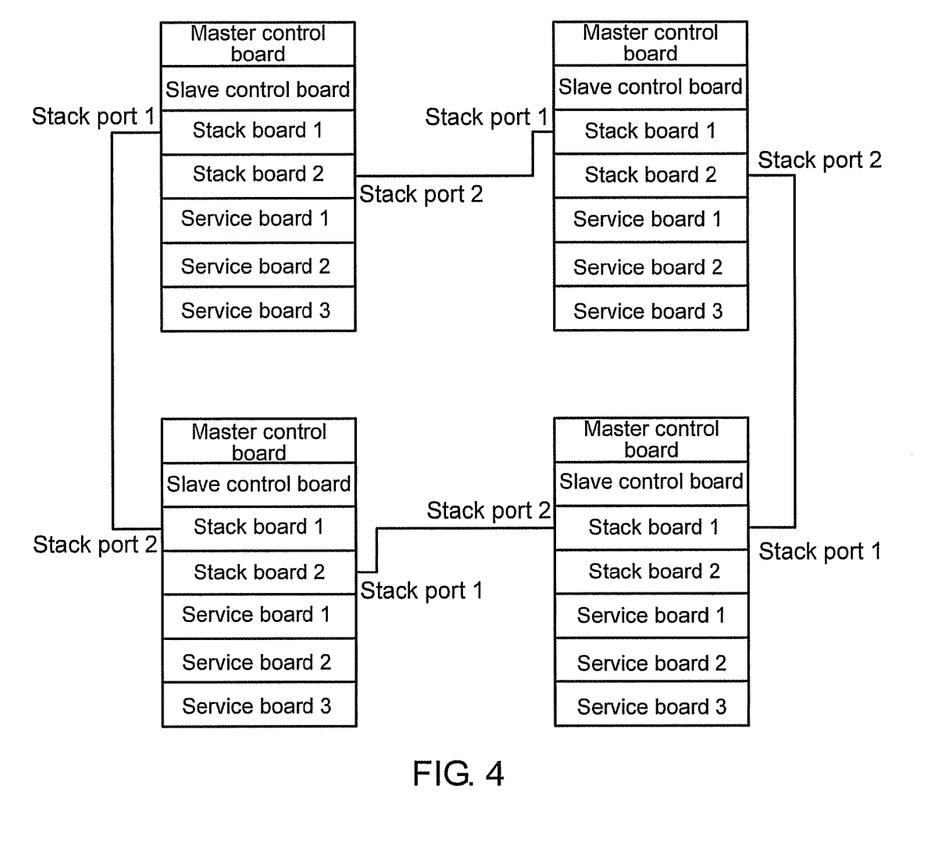
FIG. 4 illustrates the stacking system comprising dual control board devices according to the embodiment of the present invention.

The following describes the preceding method provided by the present invention. As shown in FIG. 4, in the stacking system comprises dual control board devices, each dual control board device having separate slots, one for the master control board and the other for the slave control board. That is, a member device may have two topology nodes that can be connected to other member devices through one or two stack ports.

The master control board of a dual control board device sends out topology advertisement messages and hello packets. In addition to information about the master control board, the advertised topology information of the dual control board device also includes information about the slave control board if a slave control board is present, because the latter actively sends its information to the master control board once inserted into the device. For example, if a dual control board device with member ID designated ID1 is installed with both the master and slave control boards, the master control board advertises the topology information including the member ID of this dual control board device, priority information, internal topology connections, roles of the master and slave control boards, and bridge MAC addresses of the master and slave control boards. If no master of the stacking system is elected, roles of the master and slave control boards are non-master by default. If the master control board is elected as the master of the stacking system, the role of the master control board is advertised as master in the topology information. Internal topology connections can include slot numbers and other information.

Returning to FIG. 3, at step 303, a system master board of the stacking system is elected from among the master control board of the dual control board device and one or more control boards of the other member devices. The election strategy for the master device can be configured as needed. For example, when the master control board of the member device with the highest priority is elected as the master, and the slave control board of that member device takes over the master role once the master control board fails. Another example of the election strategy is that the control board with the longest operation time or lowest MAC address is elected as the master. Other examples are omitted here.

The master control board serving as the master collects the topology information advertised by other master control boards to generate the topology information of the whole stacking system, and then broadcasts the topology information to other member devices in the stacking system. Upon receiving the topology information of the stacking system through a stack port, a member device stores the topology information or updates the stored topology information, and backs up the stored topology information to the slave control board if a slave control board is present. The backup operation can be performed according to a schedule, or when the topology information of the stacking system stored by the master control board changes. The master control board backs up the topology information of the stacking system to the slave control board in time, so that the slave control board is also aware of the topology information of the whole system. Once the master control board fails or is removed, the slave control board takes over the job of the master control board in time and ensures the normal operation of services such as packet forwarding according to the stored topology information.

The following events may occur in a dual control board device:

Event 1: If a member device is not inserted with any slave control board, the master control board of the member device advertises the topology information about the master control board only. When a slave control board is inserted, the slave control board sends a registration message periodically to the master control board after starting up. The message contains information about the slave control board and is sent out until an acknowledgement message is received from the master control board. Upon receiving the registration message, the master control board obtains the slave control board information, sends an acknowledgement to the slave control board, adds the information to the device topology information to be advertised, and backs up the topology information of the stacking system stored to the slave control board. Due to the change in the device topology information advertised by the master control board, that is, the slave control board information is further included, the master device re-generates the topology information of the stacking system and broadcasts the information to other member devices for them to update.

Event 2: When the master control board fails or is removed, master/slave switchover occurs. That is, the slave control board becomes the master control board and takes over the job of the former master control board, including advertising the topology information of the member device in which the master control board resides, receiving the topology information of the stacking system, and sending out hello packets to re-establish neighboring relations and the stacking topology. The topology information advertised includes information about the new master control board only.

If the faulty or removed master control board is the master, the new master control board takes over the master role, sets the role of the master control board to master in the device topology information advertised, collects topology information of member devices, and generates and broadcasts topology information of the stacking system. If the faulty or removed master control board is not the master, the role of the master control board is not changed, and the new master control board takes over the job of the faulty master control board only.

Figure 5:
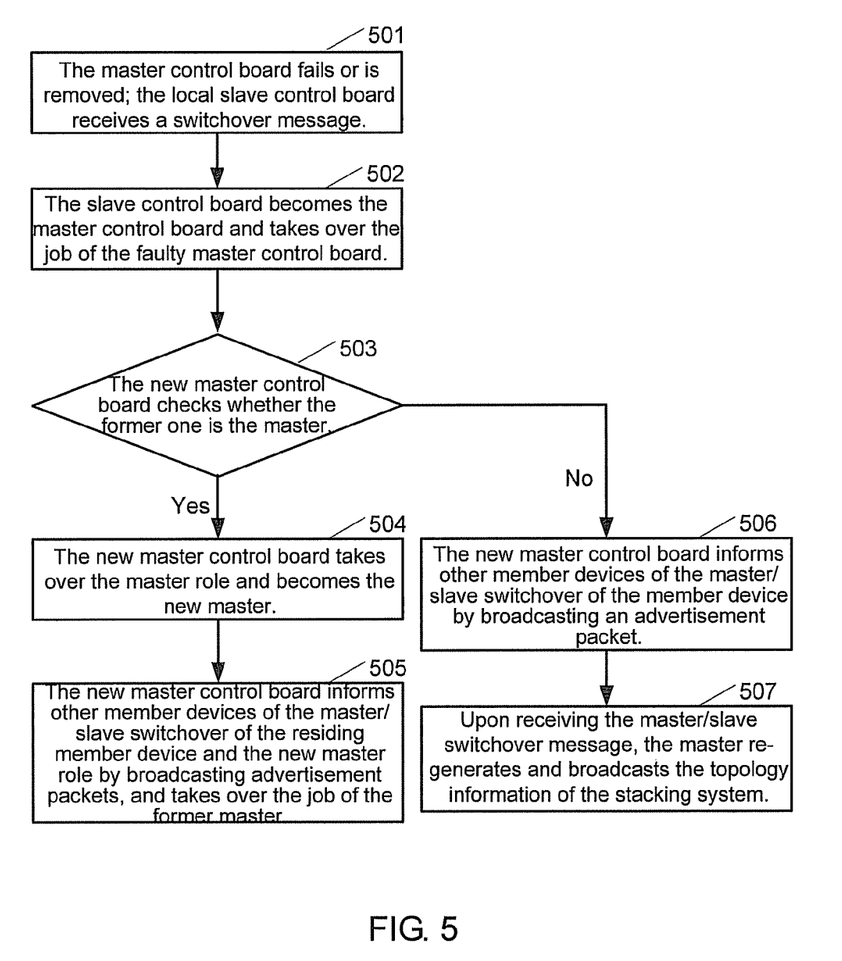
FIG. 5 is a flow chart of master/slave switchover according to the embodiment of the present invention.

As shown in FIG. 5, the flow chart of event 2 comprises the following steps.

At step 501, the master control board fails or is removed, and the local slave control board receives a switchover message.

The topology detection module in the slave control board detects the status of the master control board. The reception of a switchover message means that the master control board failed or was removed and a master/slave switchover is required.

At step 502, the slave control board becomes the master control board and takes over the job.

The new master control board starts to advertise the topology information of the member device in which the master control board resides, receives the topology information of the stacking system, and sends out hello packets to re-establish neighboring relations and the stacking topology. The topology information advertised includes information about the new master control board only.

At step 503, if the new master control board detects that the former master control board is the master, step 504 is executed; otherwise, step 506 is executed.

At step 504, the new master control board takes over the master role and becomes the master.

At step 505, the new master control board informs other member devices of the master/slave switchover and the new master role by broadcasting advertisement messages, and takes over the master operations.

Other member devices update the topology information stored upon receiving the advertisement messages sent by the new master control board.

At step 506, the new master control board informs other member devices of the master/slave switchover by broadcasting advertisement messages.

At step 507, the master re-generates and broadcasts the topology information of the stacking system upon receiving the master/slave switchover message.

Event 3: After detecting that the slave control board fails or is removed, the master control board excludes the slave control board information from the device topology information to be advertised and stops backing up the stored topology information of the stacking system to the slave control board. When confirming that the topology information of the master device or the topology information sent by the master changes, the master re-generates and broadcasts the topology information of the stacking system.

In addition, the stacking system's topology information generated by the master can include the number of each board. Boards can be numbered according to the connection relations of each member device. The boards include control boards, stack boards, and service boards. The numbering methods can be as follows:

Method 1: The number of a board can comprise the member device ID and the slot number. For example, on a member device whose device ID is 2, the master control board in slot 1 is numbered 2/1, the slave control board in slot 2 is numbered 2/2, stack board 1 in slot 3 is numbered 2/3, and service board 1 in slot 5 is numbered 2/5.

Method 2: Each board is numbered according to the member device ID, slot number and the predefined numbering strategy. For example, suppose the numbering strategy is set as follows: The number of a board in the stacking system= (member device ID−1)×maximum number of slots supported by a member device+slot number. If the maximum number of slots a member device supports in the stacking system is 12, the boards in slot 0, 1, and 5 of the member device whose member ID is 2 are numbered 12, 13, and 17, respectively.

Figure 6:
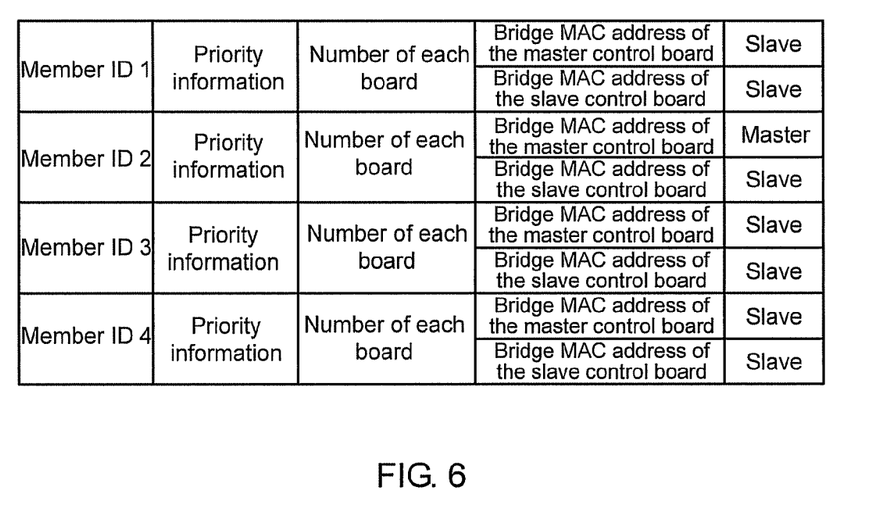
FIG. 6 illustrates the topology information of the stacking system according to the embodiment of the present invention.

FIG. 6 shows the topology information of a stacking system. The topology information includes the member device IDs, priorities, numbers of boards in the stacking system, roles of master and slave control boards, and bridge MAC addresses of master and slave control boards.

The following describes the dual control board device provided in an embodiment of the present invention. The dual control board device can comprise a master control board and a slave control board.

The master control board advertises through a stack port the topology information of the member device in which the master control board resides, including information about the master control board and, if a slave control board is inserted into the device, information about the slave control board; stores the topology information or updates the existing topology information upon receiving the topology information of the stacking system through the stack port, and backs up the stored topology information of the stacking system to the slave control board after a slave control board is inserted.

The slave control board stores the topology information of the stacking system or updates the existing topology information.

The topology information advertised by the member device with the master control board installed after the slave control board is inserted comprises the member device ID, priority information, internal topology information, role information about whether the master control board or the slave control board is the master, and the bridge MAC addresses of the master and slave control boards.

In addition, before a master is elected in the stacking system, the master control board also elects one of the master control boards as the master according to the topology information advertised by member devices. After being elected as the master, a master control board collects the topology information advertised by other master control boards, generates the topology information of the stacking system, and broadcasts the topology information in the stacking system.

The detailed election strategy for the master can be as described in the preceding methods.

According to the three events that may occur in a dual control board device, the dual control board device also provides the following:

1. The slave control board, after being inserted into the dual control board device, can periodically send a registration message containing the slave control board information to the master control board until it receives an acknowledgement from the master control board.

The master control board, upon receiving a registration message, sends an acknowledgement to the slave control board, adds the slave control board information to the topology information of the member device in which the master control board resides, and starts to back up the stored topology information of the stacking system to the slave control board.

The master control board backs up the stored topology information of the stacking system to the slave control board as scheduled or when the topology information of the stacking system changes.

2. The dual control board device, after detecting that the master control board fails or is removed, becomes the master control board, takes over operations of the master control board, and, if the former master control board is the master, takes over the master role and operations.

3. After detecting that the slave control board fails or is removed, the master control board excludes the slave control board information from the device topology information to be advertised and stops backing up the stored topology information of the stacking system to the slave control board.

According to the preceding events, the master control board serving as the master also re-generates and broadcasts the topology information of the stacking system if a change is detected in the topology information of the member device in which the master resides or in the topology information received.

In the preceding structure, the master control board runs a topology management protocol agent module and a topology management protocol module. The topology management protocol agent module exchanges messages with and backs up the topology information of the stacking system to the slave control board. The topology management protocol module advertises the topology information of the member device, receives, stores and updates the topology information of the stacking system, and transmits hello packets.

The preceding description shows that the master control board of a dual control board device advertises topology information of the member device in which the master control board resides, wherein the topology information includes information about the master control board and, if a slave control board is present, information about the slave control board. Thus the master control board and the slave control board serve as two topology nodes in the stacking system topology. In addition, after storing or updating the topology information of the stacking system according to the received information, the master control board backs up the topology information to the slave control board, so that the slave control board can also establish the stacking system topology. Upon a master/slave switchover due to a master control board failure or removal, the slave control board becomes the master control board in time, thus ensuring that the member device does not quit the stacking system and that services such as packet forwarding are performed normally according to the topology information of the stacking system.

It is to be understood that the above description discloses preferable embodiments of the present invention, and is intended to be illustrative and not restrictive. Various modifications, alternate constructions, and equivalents will be obvious to those with skill in the art. Thus, the scope of the present invention is limited solely by the metes and bounds of the appended claims.

The invention claimed is:

1. In a first device communicatively coupled with each of one or more other devices of a stacking system that includes the first device, a method for managing topology information of the stacking system, the method comprising:
    at a master control board of the first device, advertising first device topology information via a stack port on the first device, the first device topology information including information about both the master control board of the first device and a slave control board of the first device; and
    receiving topology information of the stacking system via the stack port, storing the received topology information of the stacking system on the master control board, and backing up the received topology information of the stacking system on the slave control board.

2. The method of claim 1, wherein storing the received topology information of the stacking system on the master control board comprises updating existing topology information of the stacking system on the master control board.

3. The method of claim 1, wherein backing up the received topology information of the stacking system on the slave control board comprises backing up a copy of the received topology information of the stacking system from the master control board to the slave control board in response to at least one of (i) a periodic backup operation of the master control board, and (ii) receiving topology information of the stacking system that differs from previously received topology information of the stacking system.

4. The method of claim 1, wherein backing up the received topology information of the stacking system on the slave control board comprises storing a copy of the topology information of the stacking system on the slave control board.

5. The method of claim 4, wherein storing a copy of the topology information of the stacking system on the slave control board comprises updating existing topology information of the stacking system on the slave control board.

6. The method of claim 1, further comprising:
    via the stack port, receiving respective device topology information advertised from each of the one or more other devices; and
    based both on the received, respective device topology information and on the first device topology information, electing a system master board of the stacking system from among the master control board of first device and one or more control boards of the one or more other devices.

7. The method of claim 6, wherein electing a system master board of the stacking system from among the master control board of first device and one or more control boards of the one or more other devices comprises electing the master control board of the first device as the system master board of the stacking system.

8. The method of claim 6, further comprising:
    at the master control board of first device, collecting the respective device topology information advertised from each of the one or more other devices;
    at the master control board of first device, generating topology information of the stacking system from the respective device topology information and the first device topology information; and
    at the master control board of first device, broadcasting the generated topology information of the stacking system to each of the one or more other devices.

9. The method of claim 8, wherein the first device topology information further includes a device ID of the first device, priority information of the first device, internal topology information of the first device, a bridge MAC address of the master control board, a bridge MAC address of the slave control board of the first device, and an indication of whether one of the master control board of the first device and the slave control board of the first device is designated as the system master board, and wherein, for each respective device of the one or more other devices, the respective device topology information includes:

information about a master control board of the respective device, information about whether a slave control board is present in the respective device and if so, information about the slave control board of the respective device, a device ID of the respective device, priority information of the respective device, internal topology information of the respective device, a bridge MAC address of the master control board of the respective device, if a slave control board is present in the respective device, a bridge MAC address of the slave control board of the respective device, and an indication of whether one of the master control board of the respective device and the slave control board of the respective device is designated as the system master board.

10. The method of claim 9, wherein the internal topology information of the first device comprises a slot number for each of one or more device boards installed in the first device, including the master control board of the first device, wherein, for each respective device of the one or more other devices, the internal topology information of the respective device comprises a slot number for each of one or more device boards installed in the respective device, wherein the topology information of the stacking system comprises a unique identifier for each respective device board of a plurality of device boards of the stacking system, the plurality of device boards including the one or more device boards installed in the first device and the one or more device boards installed in each respective device of the one or more other devices, and wherein the unique identifier of each respective device board associates the respective device board with the device in which the respective board is installed.

11. The method of claim 1, further comprising:
at the slave control board, taking over operations of the master control board in response to an occurrence of a failure condition, the failure condition being at least one of failure of the master control board, and removal of the master control board from the first device.

12. The method of claim 11, wherein the master control board is a system master board of the stacking system when the failure condition occurs, and wherein taking over operations of the master control board comprises taking over operations of the system master board of the stacking system.

13. The method of claim 1, further comprising:
in response to an occurrence of a failure condition, the failure condition being at least one of failure of the slave control board, and removal of the slave control board from the first device:
excluding information about the slave control board of the first device from the advertised first device topology information, and
ceasing backing up the received topology information of the stacking system on the slave control board.

14. The method of claim 1, further comprising:
electing the master control board of the first device as a system master board of the stacking system;
at the system master board of the stacking system collecting respective device topology information advertised from each of the one or more other devices, generating topology information of the stacking system from the respective device topology information and the first device topology information, and broadcasting the generated topology information of the stacking system to each of the one or more other devices; and thereafter regenerating and rebroadcasting the topology information of the stacking system at the system master board of the stacking system in response to detecting a topology change condition, the topology change condition being at least one of a change in the first device topology information, and a change in the respective device topology advertised from at least one of the one or more other devices.

15. In a first device communicatively coupled with each of one or more other devices of a stacking system that includes the first device, a method for managing topology information of the stacking system, the method comprising:
at a master control board of the first device, advertising first device topology information via a stack port on the first device, the first device topology information including information about the master control board of the first device;
via the stack port, receiving topology information of the stacking system, storing the received topology information of the stacking system on the master control board;
upon insertion of a slave control board into the first device, periodically sending a registration message from the slave control board to the master control board of the first device until the slave control board receives an acknowledgement from the master control board of the first device, the registration message containing information about the slave control board; and
upon receiving the registration message at the master control board of the first device:
sending an acknowledgement to the slave control board,
adding the slave control board to the advertised first device topology information,
and backing up the received topology information of the stacking system on the slave control board.

16. A first device to operate in a stacking system that includes one or more other devices, the first device comprising:
a stack port for communication with each of the one or more other devices of the stacking system;
a master control board; and
a slave control board,
wherein the master control board is to:
advertise first device topology information via the stack port, wherein the first device topology information includes information about both the master control board and the slave control board,
receive topology information of the stacking system via the stack port,
store the received topology information on the master control board, and
back up the received topology information of the stacking system on the slave control board.

17. The first device of claim 16, wherein the master control board is to store the received topology information by updating existing topology information of the stacking system previously stored on the master control board.

18. The first device of claim 16,
wherein the slave control board is to store the topology information of the stacking system backed up from the master control board.

19. The first device of claim 18, wherein the master control board is to back up the received topology information of the stacking system on the slave control board by backing up a copy of the received topology information of the stacking system from the master control board to the slave control board in response to at least one of (i) a periodic backup operation of the master control board, and (ii) receiving topology information of the stacking system that differs from previously received topology information of the stacking system.

20. The first device of claim 18, wherein the slave control board is to store the topology information of the stacking system by storing a copy of the topology information of the stacking system on the slave control board.

21. The first device of claim 20, wherein storing a copy of the topology information of the stacking system on the slave control board comprises updating existing topology information of the stacking system previously stored on the slave control board.

22. The first device of claim 18, wherein the master control board is further to:
  receive via the stack port respective device topology information advertised from each of the one or more other devices;
  based both on the received, respective device topology information and on the first device topology information, elect a system master board of the stacking system from among the master control board of first device and one or more control boards of the one or more other devices; and
  operate as the system master board of the stacking system upon being elected to do so.

23. The first device of claim 22, wherein the master control board is to operate as the system master board by:
  receiving via the stack port respective device topology information advertised from each of the one or more other devices;
  collecting the respective device topology information advertised from each of the one or more other devices;
  generating topology information of the stacking system from the respective device topology information and the first device topology information; and
  broadcasting the generated topology information of the stacking system to each of the one or more other devices.

24. The first device of claim 18, wherein the slave control board is further to take over operations of the master control board in response to an occurrence of a failure condition, the failure condition being at least one of failure of the master control board, and removal of the master control board from the first device.

25. The first device of claim 24, wherein the master control board is further to operate as a system master board of the stacking system, and the slave control board is further to take over operations of the master control board at least by taking over operations of the system master board of the stacking system.

26. The first device of claim 18, wherein the master control board is further to:
  in response to an occurrence of a failure condition, the failure condition being at least one of failure of the slave control board, and removal of the slave control board from the first device:
    exclude information about the slave control board of the first device from the advertised first device topology information, and
    cease backing up the received topology information of the stacking system on the slave control board.

27. The first device of claim 23, wherein the master control board is further to operate as the system master board by:
  regenerating and rebroadcasting the topology information of the stacking system at the system master board of the stacking system in response to detecting a topology change condition, the topology change condition being at least one of a change in the first device topology information, and a change in the respective device topology advertised from at least one of the one or more other devices.

28. The first device of claim 16, wherein the master control board is further to:
  receive a registration message from a slave control board of the first device; and
  responsively, send an acknowledgement to the slave control board, add the slave control board to the advertised first device topology information, and back up the received topology information of the stacking system on the slave control board.

29. The first device of claim 18, wherein the slave control board is further to initialize its operation upon being inserted into the first device by periodically sending a registration message to the master control board until the slave control board receives an acknowledgement from the master control board, wherein the registration message contains information about the slave control board.

* * * * *